Figure 1:
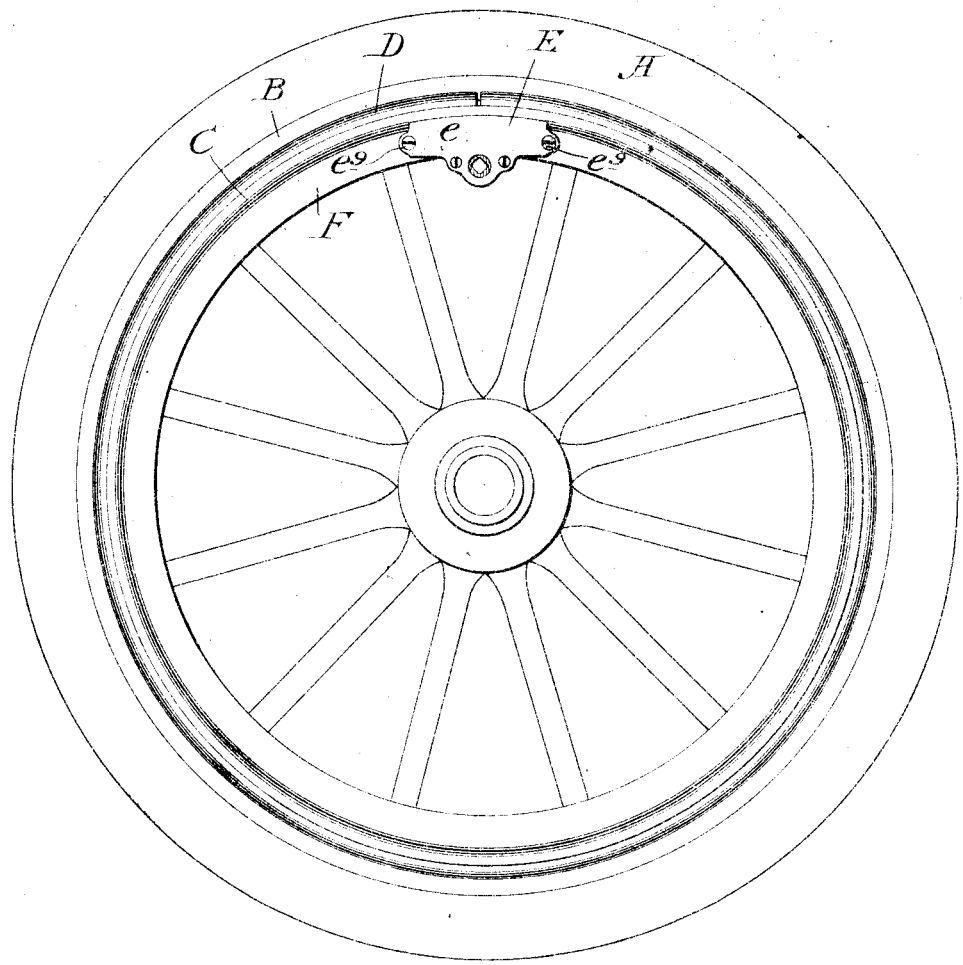

E. HOPKINSON.
VEHICLE WHEEL.
APPLICATION FILED NOV. 15, 1910.

1,065,942.

Patented July 1, 1913.
3 SHEETS—SHEET 1.

E. HOPKINSON.
VEHICLE WHEEL.
APPLICATION FILED NOV. 15, 1910.
1,065,942.
Patented July 1, 1913.
3 SHEETS—SHEET 2.
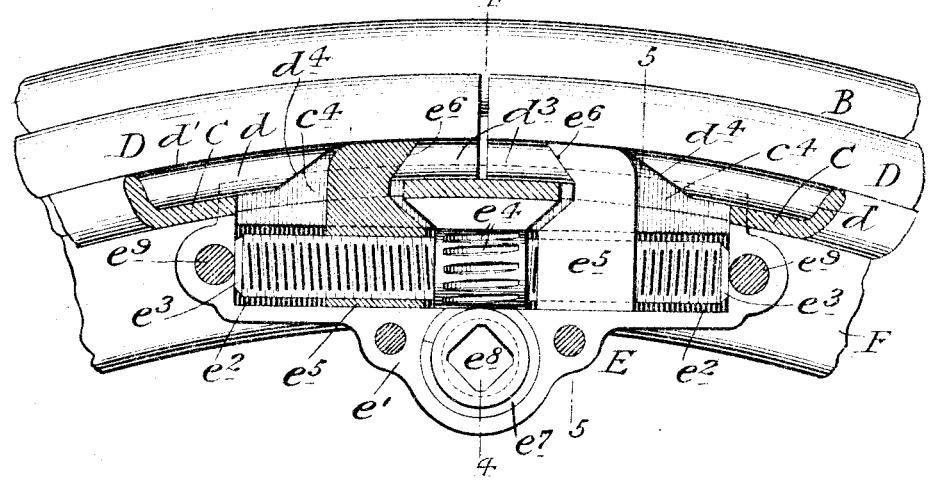
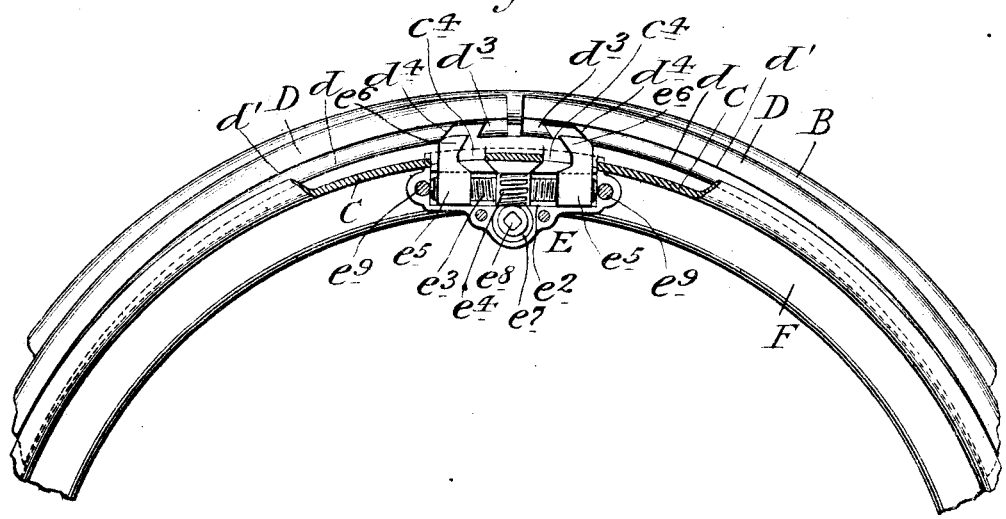
Witnesses:
Inventor E. HOPKINSON.
VEHICLE WHEEL.
APPLICATION FILED NOV. 15, 1910.
1,065,942.
Patented July 1, 1913.
3 SHEETS—SHEET 3.
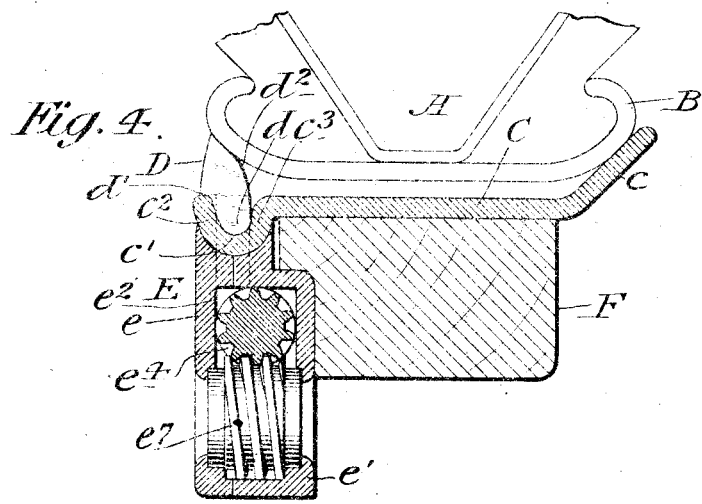
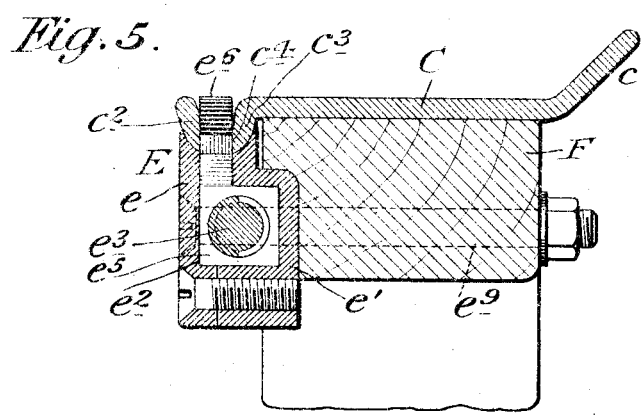
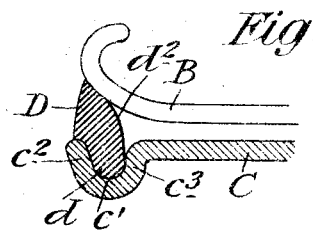
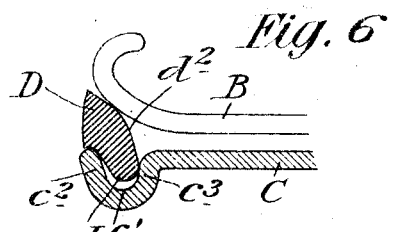
Witnesses:
Inventor
Ernest Hopkinson

UNITED STATES PATENT OFFICE.

ERNEST HOPKINSON, OF EAST ORANGE, NEW JERSEY.

VEHICLE-WHEEL.

1,065,942.  Specification of Letters Patent.  Patented July 1, 1913.

Application filed November 15, 1910. Serial No. 592,446.

*To all whom it may concern:*

Be it known that I, ERNEST HOPKINSON, a citizen of the United States, and a resident of East Orange, county of Essex, State of New Jersey, have invented certain new and useful Improvements in Vehicle-Wheels, of which the following is a full, clear, and exact description.

The present invention relates to vehicle wheels and particularly to wheels designed for use in connection with resilient or pneumatic tires for motor vehicles.

In the use of pneumatic tires for motor vehicles the practice at first was to provide the wheel with a one-piece rim permanently secured to the felly. This rim was provided with circumferential hooks or flanges adapted to engage the edges of the tire shoe. In order to place a tire shoe in position on such a rim or remove it for the purpose of repair, it was necessary to pry the edges of the shoe over one of the side flanges. Later the rim was made in several parts, one secured to the felly while one or both side flanges were made removable, the construction being provided with suitable devices for locking the removable parts in position. This form of rim is known to the trade as the "quick detachable," or "Q. D." rim. The latest practice, however, is to carry a tire ready inflated and mounted on a suitable rim (whether "one-piece" or "Q. D.") secured on the felly band of the wheel, suitable devices being provided whereby the tire-carrying rim is secured in operative position. This last construction is known to the trade as the "quick demountable." It is to this last type of construction that my invention particularly applies, no matter what form of tire-carrying rim may be employed. Heretofore various methods of fastening have been suggested, but the one in most common use consists of a felly-band permanently secured to the wheel and provided along one edge or side with a circumferential abutment. A number of bolts (usually 8) pass through the felly of the wheel and carry wedges bearing on the felly band on one side and on the other side being provided with an inclined face bearing on the under-side of the tire-carrying rim. The tightening of the nuts on the bolts forces the wedges into clamping position thereby holding the tire-carrying rim in position. This construction has a number of objections. There are a plurality of fastenings and considerable time and effort is necessary to operate them. These fastening devices must be carefully operated each a little at a time so that each one does its share of work. The bolts and nuts project beyond the rim and tire and are apt to be broken off. A space is left between the tire-carrying rim and felly band in which space dirt accumulates. Moreover, the multiplicity of parts are liable to be lost.

My invention has for its object to provide an improved construction for the purpose contemplated.

It consists of a felly band provided with a channel; a locking, wedging or clamping ring of new and peculiar form and method of operation; and a single device permanently secured in position and independent of the ring, whereby the clamping ring is moved to position to secure the tire-carrying rim firmly on the felly band; and by the same operation in reverse direction operates to remove or eject the wedging or clamping ring from position.

It has the following features of improvement: The tire-carrying rim is firmly and securely held uniformly throughout its entire circumference and the clamping ring itself is similarly supported by an immovable portion of the felly band. The means by which the tire-carrying rim is supported and firmly held on the felly band consists in the form here shown, of a broken ring which is the only loose or detached part when the tire-carrying rim is removed. The felly band and clamping ring can be manufactured by rolling mill operations without the necessity of any machine work or great precision, nor do they require any particular accuracy of construction in the tire-carrying rim. No parts project laterally beyond the edge of the tire-carrying rim or the tire itself. The clamping ring acts to secure the tire-carrying rim in position by a final combined contracting wedging operation and a tilting movement coming to final position in which it is so supported that little, if any, lateral strain is transmitted to the devices by which it is contracted and ejected. The clamping ring completely fills the space between the channel on the felly band and the side of the tire-carrying rim throughout the entire circumference and presents a very sightly appearance. The device by which the ends of the clamping ring are drawn together is permanently secured in position is operated without any specially constructed tools and with extreme rapidity in one direction to draw the ends of the clamping ring together and by the same operation in the opposite direction, to eject the same, the ejecting function being accomplished by a lifting action under the ends of the ring forcing them outward in a radial direction from the center of the wheel. In its contracting operation it automatically centers the clamping or wedging ring circumferentially which in turn automatically centers the tire-carrying rim with respect to the axis of the wheel. When in contracted position the clamping ring excludes the ingress of dirt between the tire-carrying rim and the felly band. The clamping and ejecting device is of great leverage so that the ordinary person can operate it without great exertion. The whole device is cheap and strong and the parts cannot come loose, the contracting device always holding them locked together.

In the drawings I have shown a device embodying the principles of my invention. but it will be understood that I do not limit myself to the form shown and described herein.

In said drawings: Figure 1 shows a side view of a wheel provided with a construction embodying my invention. Fig. 2 is a view in elevation, on an enlarged scale, of a portion of a wheel showing the contracting and ejecting device with the front portion of the housing removed, certain parts being broken away, and other parts being shown in vertical section. Fig. 3 is a view in elevation, on a reduced scale, showing the contracting and ejecting device with the front portion of the housing removed and a portion of the felly band broken away. Fig. 4 is a cross-section on the line 4—4 of Fig. 2. Fig. 5 is a cross-section of the felly band and contracting and ejecting device along broken line 5—5 of Fig. 2. Figs. 6 and 7 are fractional detail views in cross-section illustrating the tilting of the clamping ring in the operation of being contracted.

Like letters of reference refer to like parts throughout the several views of the drawings.

Referring to the drawings in detail, A represents the tire, B the tire-carrying rim, and C the felly band. The tire-carrying rim may be of any form, that herein shown being the ordinary one-piece clencher rim.

D represents the clamping ring and E the device for contracting, locking and ejecting the clamping ring.

F represents the wooden felly.

The felly band C is provided on one side with an inclined flange $c$ and on the opposite side with a circumferential channel $c'$. The outer wall of this channel is designated by $c^2$ and is inclined, while the inner wall $c^3$ is substantially straight. Slots $c^4$ are cut in the bottom of the channel or groove at two points to permit the hooks of the contracting and ejecting device to project through.

The clamping ring D consists of a broken ring having a portion $d$ adapted to conform to the shape of the channel or groove of the felly band. This ring is also provided with a circumferential shoulder $d'$ adapted to seat on the periphery of the inclined outer edge of the channel or groove of the felly band and has its inner face $d^2$ curved so as to permit of easy entrance of the inner portion of the ring within the channel or groove of the felly band and when drawn to contracted position exert a clamping action to secure the tire-carrying rim on the felly. Adjacent each end of the broken ring the inner or lower portion thereof is cut out so as to provide recesses which are engaged by the hooks on the contracting and ejecting device. Each of these recesses is so constructed as to form a hook $d^3$ and a cam surface $d^4$.

The device E by which the clamping ring is contracted and ejected, comprising a housing made up of a front member $e$ and a rear member $e'$ secured in any manner, as by screws. These members of the housing are so shaped as to form a square guideway $e^2$ in which is located a bolt $e^3$, one end of which is provided with a right-hand thread and the other end with a left-hand thread. At its central portion this bolt is also provided with a worm $e^4$. Located in the guideway $e^2$ are two square nuts $e^5$ each having an integrally-formed hook $e^6$ and one end of the bolt $e^3$ is threaded through one of these nuts and the other end of this bolt is threaded through the other nut, the two nuts when placed in the guideway being spaced apart equi-distant from the worm portion $e^4$. The bolt $e^3$ is turned by means of a worm wheel $e^7$ suitably positioned in the housing in mesh with the worm $e^3$, said worm wheel being provided with a square hole $e^8$ adapted to receive a correspondingly shaped bit. The entire device may be secured to the felly or felly band in any desired manner, but is here shown as fastened by bolts $e^9$ passing through the felly.

The operation of the device is as follows: The tire-carrying rim provided with its inflated tire is placed on the felly band riding on the inclined flange $c$ upon the side farther from the operator. The hooks of the contracting and ejecting device are in position widest apart. One end of the clamping ring is engaged with one of said hooks and the inner portion of said ring placed within the entrance of the groove or channel of the felly band substantially as shown in Fig. 6. This will bring the recess of the other end of the clamping ring above or slightly beyond the other hook of the clamping and ejecting device, but in the line of travel of said hook. The worm wheel is turned by a suitable tool such as a square headed crank or bit and brace, thus causing the bolt $e^3$ to turn in the proper direction to cause the nuts $e^5$ to be drawn toward each other by their thread engagement with said bolt $e^3$. As just stated, one of said hooks has been at the outset directly engaged with the recess and hook on the clamping ring. The first result therefore of the operation of the contracting and ejecting device will be to cause a circumferential movement of the entire ring until it is centered, which occurs of course when both hooks of the contracting and ejecting device are in equal engagement with the recesses and hooks on the ring. The further action of the contracting and ejecting device will be to contract the ring in the channel or groove of the felly band and this simultaneously effects the tilting of the clamping ring from the position shown in Fig. 6 to the position shown in Fig. 7, thus centering the tire-carrying rim with respect to the axis of the wheel, causing the farther side of said rim to ride up and wedge on the inclined flange $c$ of the felly band and firmly holding and supporting the inner side of the tire-carrying rim by a wedging operation resulting from the combined tilting and contracting movement between it and the channel or groove of the felly band, the clamping ring coming to seat on the periphery of the outer portion as well as the bottom of the channel or groove of the felly band. In this position the tire-carrying rim is securely held in position against all lateral strains (circumferential movement being positively prevented by the usual inter-engaging lugs on the felly band and the under surface of the tire rim), the space between the tire-carrying rim and the felly band is closed by the ring and the tire rim is uniformly supported throughout its entire circumference.

In order to remove the tire-carrying rim all that is necessary is to turn the worm wheel in reverse direction thus causing the nuts to move away from each other and ride under the cam surface $d^4$ of the clamping ring as shown in Fig. 3. This causes the ends of the ring to rise in a substantially radial direction and so dislodges or ejects the ring from the channel or groove of the felly band that it is easily removable by hand. It will be seen that by this method of operation the ring is contracted or dislodged in the manner requiring the minimum power, that is, by a radial movement, or at any rate, by a combined radial and circumferential movement.

It will be observed that the clamping ring has no permanent connection with the contracting and ejecting device; and that for the purpose of permitting the removal of the tire-carrying rim it is completely disassociated from the contracting and ejecting device and removed from its channel. In fact the contracting device acts in one direction to draw the ends of the ring together, in this operation causing the ends to move circumferentially and also toward the center, these movements rendering the engagement with the contracting device progressively more complete. In the opposite direction, however, the main function of the contracting device is not to expand the ring, not to effect the exact reverse of its contracting operation, but to eject or lift the ends of the ring radially out of the channel and from between the tire-carrying rim and the felly-band or channel. This work is comparatively light as compared with effecting a circumferential movement of the entire ring, which would result if the device acted to expand as well as to contract. Whatever expanding effect the contracting and ejecting device may have on the ring is incidental to its more important function of ejecting. By the disassociation or disengagement of the contracting and ejecting device from the clamping ring, and the operation of that device to lift the ends of the ring or eject them, the clamping ring may be easily removed completely by grasping one of the ejected ends and pulling in a direction from the center of the wheel. It is to be remembered that the force necessary to expand the ring in its channel after perhaps several months' use on the road will be a great deal more than is necessary to contract it. After use for some time a certain amount of grouting and corrosive adhesion has taken place, so that the device and the force by which it was contracted may be totally inadequate to expand it in a plane parallel with the surface with which it is in contact, so that when I use the word "eject" or the word "ejecting" in the claims I mean to import a movement of the ends of the clamping ring in a direction generally from the center of the wheel and independently of or to a greater degree than obtains at a point diametrically opposite, this movement at the same time effecting disengagement of the ends of the ring from the contracting and ejecting device.

What I claim as new is:—

1. In a wheel adapted for use in connection with a resilient tire, the combination of a tire-holding rim, a felly-band provided with a groove or channel along one side, a broken ring located in said groove or channel, means for securing said ring in position comprising a hook adapted to engage the end of the broken ring and acting in one direction to contract the broken ring and in the opposite direction to disengage from and eject or lift the end of the broken ring out of the groove or channel, and means for moving said contracting and ejecting device in opposite directions.

2. In a wheel adapted for use in connection with a resilient tire, the combination with a tire-holding rim, a felly-band provided with a groove or channel along one side, a broken ring located in said groove or channel, a contracting and ejecting device co-acting with said broken ring and comprising two members each of which consists of a hook engaging the ends of the broken ring, and means for moving said members toward each other to engage the ends of the broken ring and draw them together, and in the opposite direction for disengaging and ejecting or lifting the ends of the broken ring out of the groove or channel.

3. In a wheel adapted for use in connection with a resilient tire, the combination of a tire-holding rim, a felly-band provided with a groove or channel along one side, a broken ring, a contracting and ejecting device co-acting with said broken ring and comprising two members each of which consists of a nut having a hook extension adapted to engage the end of the broken ring, a housing for said contracting and ejecting device having a straight guideway in which the nuts each provided with a hook extension are located, and a screw device, the threads of which engage the nuts of the contracting and ejecting device to move them toward and away from each other.

4. In a vehicle wheel adapted for use in connection with a resilient tire, the combination of a tire-holding rim, a felly-band provided with a groove or channel along one side, a broken ring, means for securing said ring in position comprising a contracting and ejecting device provided with a nut having a hook extension engaging one end of said ring, a housing for said contracting and ejecting device, said housing being provided with a straight guideway in which is located the nut of the contracting and ejecting device, and a screw for moving the contracting and ejecting device in opposite directions.

5. In a wheel adapted for use in connection with a resilient tire, the combination of a tire-holding rim, a felly-band provided with a groove or channel along one side, a removable broken ring provided with hooked ends and located in said groove or channel, a contracting and ejecting device comprising two members adapted to engage the hooked ends of the broken ring, and means for moving said members toward each other to engage and draw the ends of the broken ring toward each other and in the opposite direction to disengage from and eject the ends of the broken ring from the groove or channel.

6. In a wheel adapted for use in connection with a resilient tire, the combination of a tire-holding rim, a felly-band provided with a groove or channel along one side, a broken ring provided with hooked ends each having a cam surface, a contracting and ejecting device comprising two hooks adapted to engage the hooked ends of the broken ring, and means for drawing the hooks toward each other when engaged with the hooked ends of the broken ring to contract the same, said means acting in the reverse direction to cause the hook to contact with the cam surface on the broken ring whereby the end of the broken ring is lifted or moved radially.

7. In a wheel adapted for use in connection with a resilient tire, the combination of a tire-holding rim, a felly-band provided with a groove or channel along one side, a broken ring, the ends of which are provided with engaging means, a contracting and ejecting device consisting of a housing provided with a straight guideway, two hooks adapted to engage the ends of the broken ring and each having a portion fitting in said guideway, a bolt having a worm on its central portion, one end of said bolt being threaded in one direction through one of said hooks and the other end of said bolt being threaded in the opposite direction through the other of said hooks, and a worm-wheel in said housing engaging the worm on the bolt.

8. In a wheel for use in connection with a resilient tire, the combination of a tire-holding rim, a felly-band provided with a groove or channel along one side, a broken ring provided with hooked ends and removably located in said groove or channel, means for engaging said ends and comprising a contracting and ejecting device secured adjacent said groove or channel and comprising a hook projecting into said channel and engaging the hooked end of the broken ring, and means for moving said hook in one direction to engage and contract the ring and in the opposite direction to disengage and lift or eject the end of the ring from the groove or channel.

Signed this 14th day of November, 1910.

ERNEST HOPKINSON.

Witnesses:
H. RICHARD WOBBE,
EDW. W. VAILL.